US005531131A

United States Patent [19]

Sabloewski

[11] Patent Number: 5,531,131

[45] Date of Patent: Jul. 2, 1996

[54] DEVICE FOR ADJUSTING CORRECTION FACTOR OF A PLUNGER LIFT PIPET

[75] Inventor: Horst Sabloewski, Hamburg, Germany

[73] Assignee: Eppendorf-Netheler-Hinz GmbH, Hamburg, Germany

[21] Appl. No.: 326,999

[22] Filed: Oct. 21, 1994

[30] Foreign Application Priority Data

Oct. 21, 1993 [DE] Germany .......................... 43 35 863.2

[51] Int. Cl.[6] ................................................ G01N 1/14

[52] U.S. Cl. .................................... 73/864.18; 73/864.16; 422/100; 222/309

[58] Field of Search ............................ 73/864.13, 864.14, 73/864.16, 864.18; 422/100; 222/309

[56] References Cited

U.S. PATENT DOCUMENTS

| | | | |
|---|---|---|---|
| 3,013,435 | 12/1961 | Rodrigues, Jr. | 73/864.18 |
| 3,613,952 | 10/1971 | Gilmont | 73/864.18 |
| 3,827,305 | 8/1974 | Gilson et al. | 73/864.18 |
| 4,096,751 | 6/1978 | Withers et al. | 73/864.18 |
| 4,250,755 | 2/1981 | Kenney | 73/864.13 |
| 4,554,134 | 11/1985 | Tervamäki et al. | 73/864.18 |
| 4,672,857 | 6/1987 | MacDermott | 73/864.18 |
| 4,909,991 | 3/1990 | Oshikubo | 73/864.18 |
| 5,320,810 | 6/1994 | Al-Mahareeq et al. | 73/864.13 |

*Primary Examiner*—Hezron E. Williams
*Assistant Examiner*—Nashmiya Ashraf
*Attorney, Agent, or Firm*—Anderson Kill Olick & Oshinsky

[57] ABSTRACT

A plunger lift pipet for a slip-on pipet tip which includes adjusting mechanism for changing the travel of the plunger, display mechanism for the liquid volume pipetted each time, disengageable coupling mechanism between the adjusting mechanism and the display mechanism for changing a pipet correction factor determining the relation between the travel of the plunger and the indicated liquid volume, the coupling mechanism positively connecting to each other the adjusting mechanism and the display mechanism and switching mechanism for completely disengaging the coupling mechanism and changing the pipet correction factor by setting the adjustment mechanism being provided.

12 Claims, 3 Drawing Sheets

DEVICE FOR ADJUSTING CORRECTION FACTOR OF A PLUNGER LIFT PIPET

BACKGROUND OF THE INVENTION

The object of the invention relates to a plunger lift pipet which comprises adjusting means for changing the travel of the plunger, display means for the liquid volume pipetted each time, disengageable coupling means arranged between the adjusting means and the display means for changing a pipet correction factor which determines the relation between the travel of the plunger and the indicated liquid volume.

Plunger lift pipets of the type mentioned at the beginning comprise a cone where. a pipet tip can be attached to. The attached pipet tip communicates with a cylinder where a plunger is arranged which can be actuated from outside. The plunger travel can be changed by means of adjusting means, in which case display means are provided for indicating each of the pipetted liquid volume. In most cases, however, the liquid volume absorbed by the pipet tip is different from the indicated one. The difference between the actually absorbed and the indicated liquid volume is also designated as a deviation in accuracy. Usually, the deviation in accuracy can be changed via the adjustment area of the plunger lift pipet.

Decisive for the degree of the deviation in accuracy and the results obtained via the adjustment area are the progress of the cross-section area along the plunger tip, the stagnant volume between the intake of the pipet tip and the plunger as well as the transmission parameters of the adjustment means for the plunger travel and the display means for the liquid volume. The dependence on the tip section and the stagnant volume results from the fact that the air cushion provided between the liquid level and the plunger is weighted by the liquid column in the tip, for which reason the air cushion is increased in size.

A system consisting of a plunger lift pipet and a pipet tip shows a defined deviation in accuracy for any certain liquid at any adjusted liquid volume (compare also DE 42 09 620 C1). If, however, the liquid density changes with the liquid to be pipetted, a change of the weight by which the liquid column weighs down the air cushion and of the deviation in accuracy of each adjusted liquid volume results as well.

An adaptation of the deviation in accuracy may be performed by changing a pipet correction factor. It is decisive for the relation between the adjusted plunger travel and the adjusted liquid volume. A few known plunger lift pipets have already been provided with an adjusting means for the pipet correction factor.

One possibility is the adjustment of a sliding clutch between the adjusting means for the plunger travel and a counter mechanism. For this purpose, the pipet body comprises an aperture through which a screw driver can engage a sliding clutch of a bevel gear set. The connection between the volume adjustment and the counter mechanism can be changed by holding the volume adjusting means and turning the screw driver or vice versa. A control of the deviation in accuracy so obtained may be made by weighing a pipetted quantity. This adjusting means of the pipet correction factor is not particularly easy accessible from outside and, in most cases, is only used for a factory adjustment or, respectively, by the customer in special cases.

As concerns the adjustable dilution means according to the DE-A1-27 20 669, the adjusting means comprise an adjustable screw nut for adjusting an abutment for the plunger dipping means, said abutment being tightly connected to the adjustable screw nut and said adjustable screw nut being connected to a threaded rod via a comet screw which threaded rod is connected to a volume display. The comet screw can be removed for adjusting the zero setting of the volume display and the abutment can be changed by means of the adjustable screw nut.

The U.S. Pat. No. 4,165,646 discloses a pipetting means, the adjusting means of which comprise an actuating bushing for receiving the upper end of an abutment bushing of a plunger rod. Thus, the plunger travel can be changed by turning the actuating bushing. Said actuating bushing at the same time includes a covering bushing which surrounds the abutment bushing and the upper portion of a cylindrical body. The body includes a volume scale and the covering bushing comprises a window for making all adjusted volume value visible. According to a modification of this means, the covering bushiug is adjustably secured to the upper bushing for calibration purposes.

The U.S. Pat. No. 4,501,163 describes a pipet means which includes a head for an axial plunger displacement and for adjusting the plunger travel by turning an abutment bushing which head, at the same time, is connected to a counting mechanism so as to be secured against rotation. This means can be calibrated by turning a bushing which receives the abutment bushing for the plunger rod by an internal thread.

The U.S. Pat. No. 4,023,716 discloses a micropipet which in an axially displaceable plunger rod comprises a displacement plunger projecting from the lower end of said plunger rod. The plunger is secured within the rod by means of a screw and can be axially displaced after removing said screw and secured to another position then. In this way, an adjustment of the liquid quaunity to be measured out can be realized.

The EP-A1-0 286 676 describes a pipet allowing the volume to be measured out to be changed very quickly. According to this means, all adjusting bushing is permanently connected to a display means for adjusting the plunger travel. The position of the bushing is changeable by means of an adjusting nut. The nut, however, call be disengaged from its toothing with the bushing which causes the bushing to be adjustable for the travel of the plunger with the aid of a control knob. This favours a quick adjustment of very different quantities of the volumes to be measured out.

Taking all this into cousideration, it is the object of the invention to provide a plunger lift pipet featuring a simple and safe adjustability of the deviation in accuracy.

SUMMARY OF THE INVENTION

This problem is solved by a plunger lift pipet of the above-described type in which the coupling means positively connects to each other the adjusting means (12) and the display means (20), and switching means for completely disengaging the coupling means and changing the pipet correction factor by setting the adjustment means are provided.

According to the inventive plunger lift pipet, the coupling means between the adjusting means for the liquid volume and the display means are positively connected to each other. Compared to a sliding clutch, this has the advantage that no particularly close process tolerances are to be observed and that a simplified adjustment is made possible for the user. As long as the coupling means are engaged the volume adjustment with respect to the display means cannot be changed. Thus, a deviation in accuracy is exactly and safely adjustable. Furthermore, switching means are provided which easily allow the coupling means to be completely disengaged. As soon as the display means are disengaged frown the coupling means the pipet correction factor can be easily changed by displacing the adjusting means. That part of the coupling means connected to the adjusting means namely can be displaced by actuating the adjusting means with respect to that part of the coupling means being connected to the display means. Thus, the pipet correction factor can be reliably adjusted by simply switching the switching means and setting the adjusting means.

Said positive coupling means may be spur toothed gears which are connected to each other so as to be secured against rotation and are displaceable on a common axis. One of these coupling spur gears usually is connected to a spur toothed gear of the adjusting means. The other spur toothed gear usually is connected to a spur toothed gear of the display means. The coupling spur gears on their axis can be shifted from said switching means contrary to spring action, in which case at least one of the coupling spur gears disengages from the spur toothed gear of the adjusting means or, respectively, the display means (adjusting spur gear resp. display spur gear).

Preferably, the adjusting spur gear is defined on the shell of an adjusting bushing projecting from the body. The display spur gear may be a drive gear of a gear counter.

Coupling spur gears, adjusting spur gear and display spur gear may be provided on a common basic body with parallely arranged axes. This allows a preassembly and simplifies the assembly of the pipet. The basic body, at the same time, may include the counter mechanism. The axes of the coupling spur gears and the display spur gear may be anchored in the basic body. The adjusting spur gear may be arranged at the outside of a cylindrical hollow shoulder of the basic body which receives an internal thread for a spindle for adjusting the travel of the plunger. In that case, the adjusting means for the travel of the plunger may be preassembled on a basic body as well.

The cylindrical hollow shoulder may comprise one internal step each for a lower and upper abutment or, respectively, one front surface each for an upper and lower abutment of the spindle. Radial projections of the upper abutment of the spindle may engage axial internal grooves of the adjusting bushing for a rotary coupling.

Preferably, a control lever of the switching means is to be actuated from the outside of a body of the plunger lift pipet. The switching means may comprise a sliding portion arranged on an axis for the coupling spur gears and engaging the latter at the side.

An exact reading of the display volume is favoured if the counting mechanism includes a locking gear comprising a lock-in position for each full reading and an associated locking element.

On an adjusting bushing projecting from the body the adjusting means may comprise a marking and the body may comprise an associated marking, scale or an indicating scale which simplify the adjustment of the pipet correction factor and help to achieve preset values.

BRIEF DESCRIPTION OF THE DRAWINGS

Further details and advantages of the invention result from the following description of corresponding drawings of a preferred embodiment.

DETAILED DESCRIPTION OF THE PREFERRED EMBODIMENT

Figure 1:
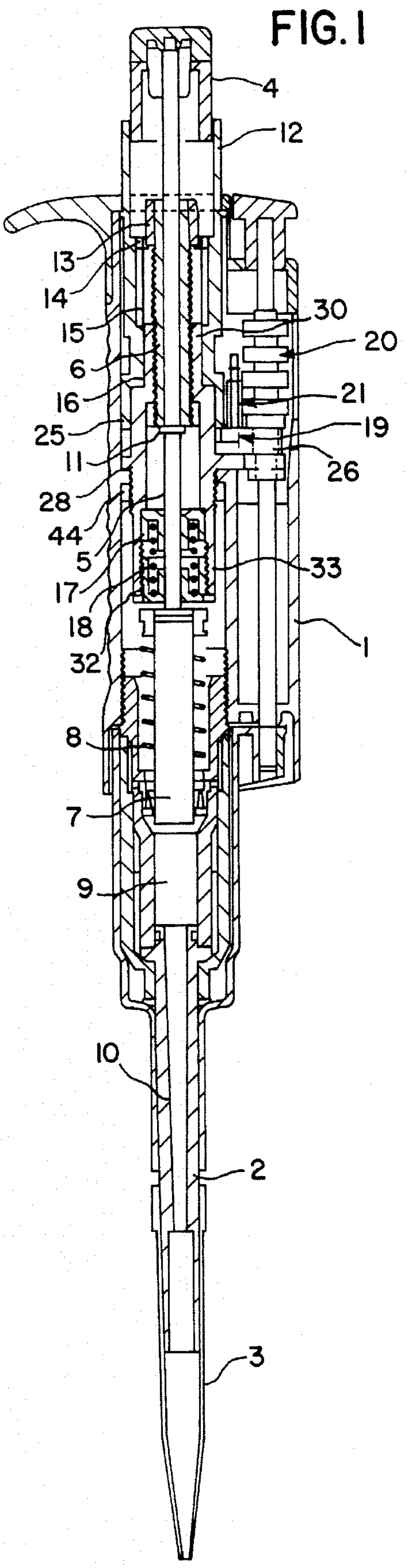
FIG. 1 is a longitudinal section of a plunger lift pipet.
Figure 2:
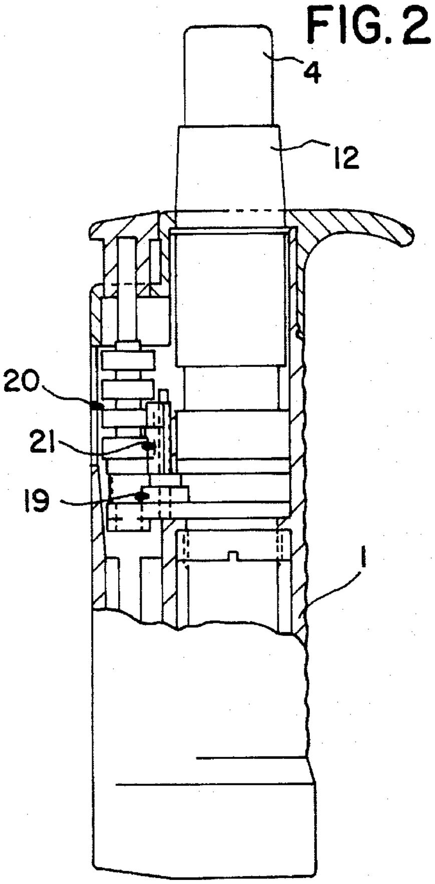
FIG. 2 is a partial section of the upper part of the same plunger lift pipet.

The plunger lift pipet comprises a body 1 which at the lower end includes a pipet tip 3 arranged on a cone 2.

At the upper end of the body 1 an actuating knob 4 is provided being connected to a plunger rod 5 which extends through a spindle 6. At the lower end of the plunger rod 5 a plunger 7 is arranged which is displaceable within a cylinder 9 contrary to the action of a spring 8.

As soon as the plunger 7 by means of the actuating knob 4 is forced vertically downward into the cylinder 9 it starts pressing air from the cylinder through the tube 10 and out of the pipet tip 3. The cylinder 9, the tube 10 and the pipet tip 3 define the stagnant volume of the pipet. The knob 4 can be actuated downwardly so as to cause the plunger 7 to abut against a lower end of the cylinder 9 which is defined by the upper end of the tube 10.

The plunger rod 5 is provided with a flange 11 which at the starting position of the rod engages the lower end of the spindle 6. This flange 11 defines the upper abutment for the plunger 7. This upper abutment can be displaced for changing the plunger travel capacity.

For this purpose, an adjusting bushing 12 being rotatable from outside is arranged around the actuating knob 4. The spindle 6 which surrounds the plunger rod 5 is connected to the adjusting bushing 12 so as to be secured against rotation. The spindle 6 has all upper abutment 13 connected thereto so as to be secured against rotation which abutment 13 with radial projections 14 is arranged in axial grooves 15 of the adjusting bushing 12. As soon as the adjusting bushing 12 is actuated by rotation the spindle 6 is screwed within the internal thread 16 tightly secured to the body, with its abutment for the flange 11 being axially displaced. As the plunger rod 5 with its flange 11 is forced by spring 8 against the lower abutment of the spindle 6 the starting position of the plunger 7 is defined by the adjustment of the adjusting bushing 12. Thus, the travel of the plunger up to the lower end of the cylinder 9 can be adjusted with the aid of the adjusting bushing 12.

The abutting of the plunger 7 against the lower end of the cylinder 9 is prevented by a lower abutment 17 going into effect and being supported by an overtravel spring 18 in the body. The flange 11 engages the lower abutment 17 in the form of a spring collar before plunger 7 is caused to abut against the lower stop of the cylinder 9.

Figure 3:
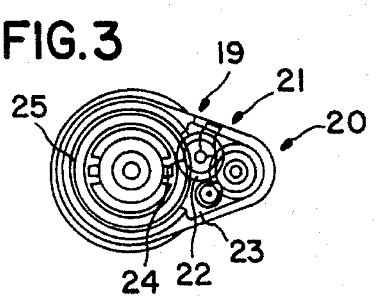
FIG. 3 is a cross-section through a counting mechanism of the same plunger lift pipet taken along line 3—3 in FIG. 1.

A counting mechanism 20 is changed via coupling means 19 as soon as the adjusting bushing 12 is manually moved. The coupling means 19 are connected to a switching means 21 provided outwardly which allows an engagement and disengagement. Details of the coupling means 19, of the counting mechanism 20 and the switching means 21 can be seen best from FIGS. 3 to 5.

The coupling means 19 comprise two coupling spur gears 22, 23 which are arranged on a common axis 24 and are connected to each other so as to be secured against rotation. The upper coupling spur gear 22 mates with an adjusting spur gear 25, with the switching means 21 being in an inoperative condition, which adjusting spur gear 25 is defined at the lower end of the adjusting bushing 12. The lower coupling spur gear 23 continuously mates with a display spur gear 26 which is arranged at the bottom of an axis 27 of the counting mechanism 20. The axes 24 and 27 of the coupling means 19 and the counting mechanism 20 are parallely anchored on a plate-like basic body 28. The basic body 28 supports a cylindrical hollow shoulder 29 parallel thereto as well which extends on both sides and which on an upper portion 30 comprises supporting means for the adjusting bushing 12 and the internal thread 16 for the spindle 6. A lower portion 31 of said shoulder 29 comprises a further internal thread 32 for receiving an abutment 33 for the overtravel spring 18 (compare FIG. 1).

Figure 7:
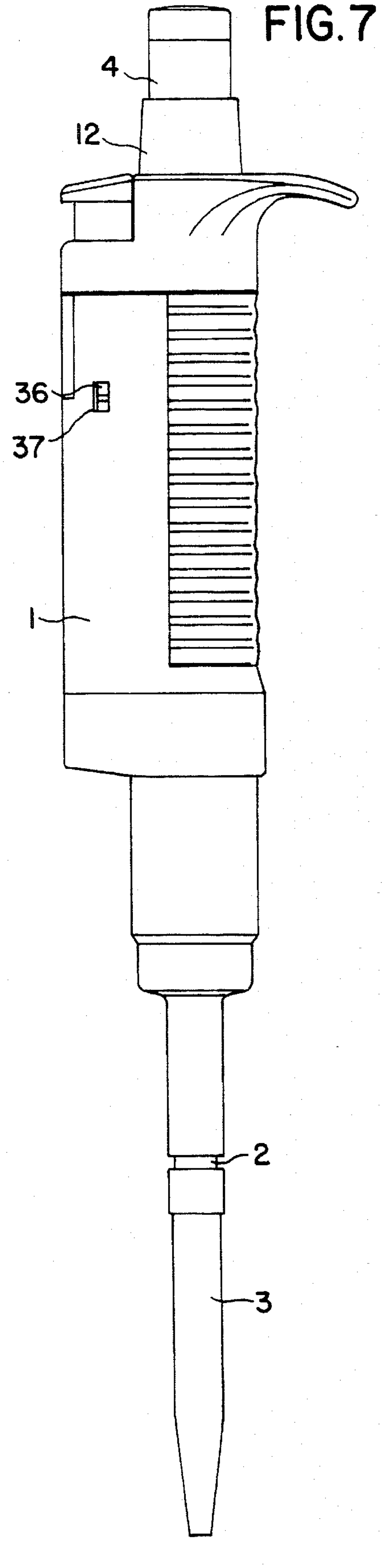
FIG. 7 is a side view of the same plunger lift pipet.

The coupling spur gears 22, 23 are supported by the basic body 28 via a helical spring 34 arranged on the axis 24. Above they are secured to the axis 24 by means of a retaining ring 34'. Between said retaining ring 34' and the upper coupling spur gear 22 the switching means 21 include a sliding means 35 arranged on the axis 24. The sliding means 35 comprises a control lever 36 provided at the side which projects into an aperture 37 of the body 1, said aperture being accessible from outside (compare FIG. 7). The upper coupling spur gear 22 can be disengaged from the adjusting spur gear 25 by displacing the control lever 36 downwardly. As soon as the switch lever 36 is released the upper coupling spur gear 22 automatically moves into engagement with the adjusting spur gear 25 again.

The counting mechanism 20 comprises counter gears 38 with numbers 0 to 9 which gears are arranged in lines on the axis 27 one upon the other. The bottom counter gear 39 is connected to the display spur gear 26 so as to be secured against rotation.

Change-over gears 41 are arranged on a further axis 40 which has been anchored in the basic body 28 parallel to the axis 27. Each change-over gear 41 engages the space between two adjacent counter gears 38 by means of a toothing. Each of the lower counter gears includes there at least one engaging portion and each of the upper counter gears comprises there a circumferentially provided toothing. As soon as the engaging portion of the lower counter gear 39 has moved at a certain angle of rotation, it starts actuating the associated change-over gear 41 which causes the counter gear 38 arranged above to move forward to the next position. Thus, a transmission to the counter gear 38 arranged above is realized.

Between the lower counter gear 39 and the display spur gear 26 a locking gear 42 is arranged which is connected to the two before-mentioned gears so as to be secured against rotation. The locking gear 42 allocates to each number of the associated counter gear 38 one recess around its circumference. A locking element 43 engages at least one recess of the locking gear 42 as soon as the lower counter gear 39 indicates a full number. In that case, the locking element 43 is carried on the further axis 40 of the counting mechanism 20. Hereby an exact alignment of the counter gears 38 and 39 as well as the reading is guaranteed.

Figure 4:
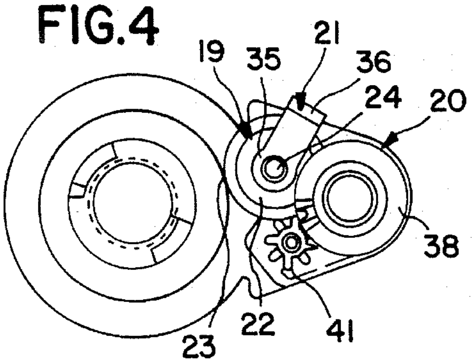
FIG. 4 is an enlarged section of the basic body including a counting mechanism of the same plunger lift pipet according to FIG. 3.
Figure 5:
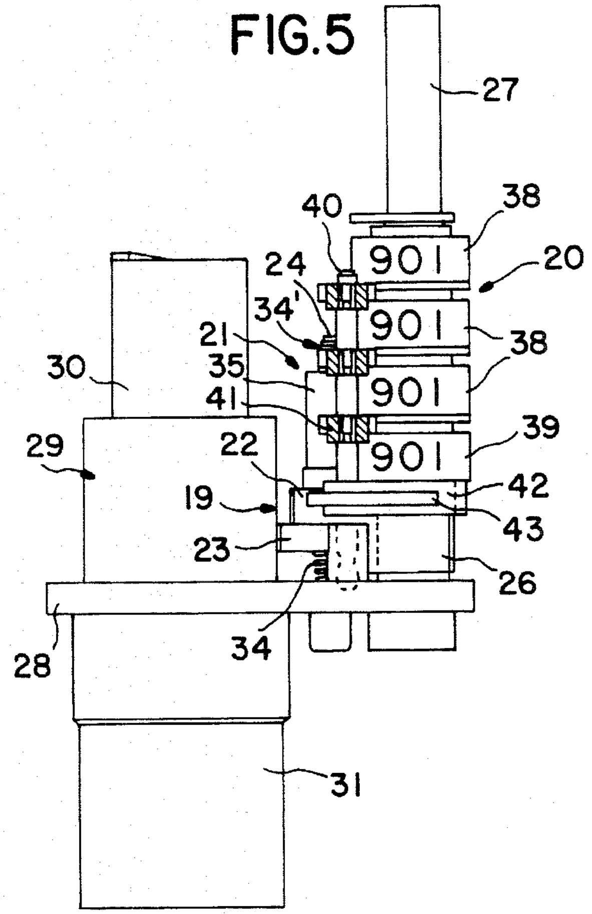
FIG. 5 is an enlarged side view of the same basic body including a counting mechanism.
Figure 6:
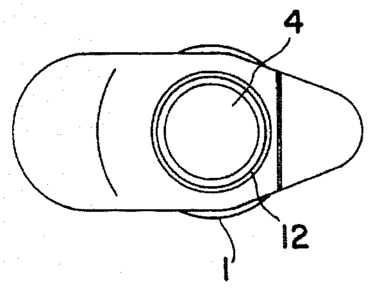
FIG. 6 is a top view of the same plunger lift pipet.

Preferably, those parts demonstrated in FIGS. 4 and 5 are mainly made of synthetic material. For the two axes and the retaining ring as well as the helical spring 34 metallic materials are preferred. The basic body 28 allows a preassembly of the coupling means 19, the switching means 21 and the counting mechanism 20. Furthermore, the plunger rod 5 with the spindle 6 as well as the adjusting bushing 12 can be preassembled on the basic body 28 as well.

Such a preassembly may include all steps tip to and including the assembly of the abutment 33 and the plunger 7. The preassembled unit is inserted into the body 1 from above and is secured thereto by means of a lock nut 44 (compare FIG. 1).

Figure 8:
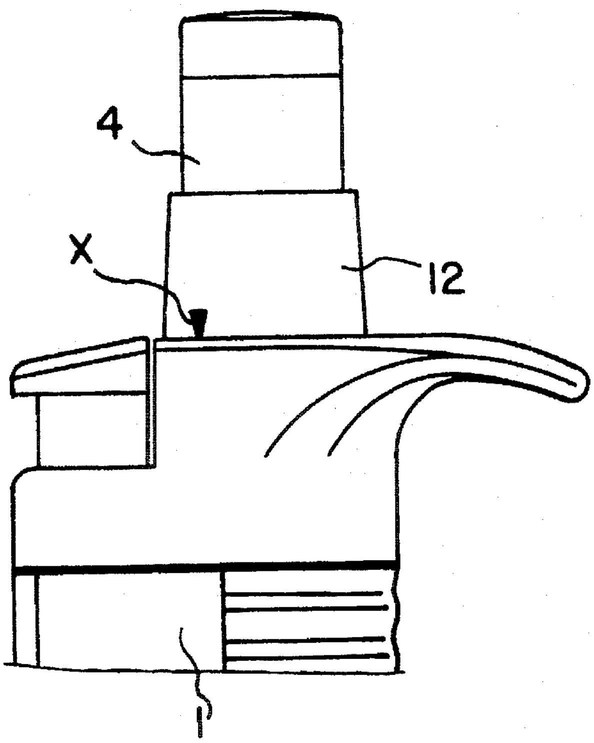
FIG. 8 is a side view of the upper part of a plunger lift pipet comprising a body marking.
Figure 9:
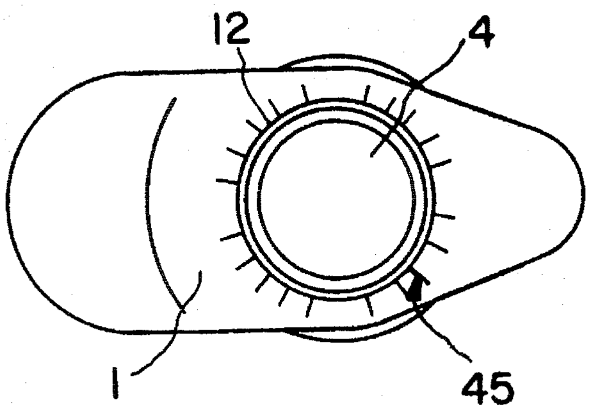
FIG. 9 is a top view of the same upper part.

According to FIGS. 8 and 9, the adjusting bushing 12 can be provided with a marking X on the portion projecting from body 1 which cooperates with a marking, scale 45 or indicating scale of the body.

The upper coupling gear 22 has engaged the adjusting gear 25 and gets into connection with the counting mechanism 20, with the control lever 36 being unactuated. Hereby the adjusting bushing 12 is tightly connected to the counting mechanism 20 so that a constant pipet correction factor is obtained. A change of the pipet correction factor is achieved by only pressing the control lever 36 downwardly and moving the adjusting bushing 12. The direction and degree of rotation are determined by the marking X and scale 45 so that a definite increase or reduction of the pipet correction factor can be realized. The latter may be determined by a measurement of deviations in accuracy which measurement may be performed by comparing the indicated liquid volumes and the intake volume determined by weight measurement.

I claim:

1. A device for adjusting a correction factor of a plunger lift pipet, comprising:

adjusting means for changing a travel path of a pipet plunger;

display means for displaying a liquid volume pipetted with each stroke of the pipet plunger;

releasable coupling means for positively connecting said adjusting means and said display means, said releasable coupling means having two gears supported on a common axis and connected to each other for joint rotation with each other, and spring means for biasing said two gears into engagement with respective gear means of said adjusting means and said display means; and switching means for displacing said two gears against a biasing force of said spring means for disengaging at least one of said two gears from a respective one of said respective gear means of said adjusting means and said display means to enable adjustment of the correction factor by manipulating said adjusting means.

2. A device according to claim 1, wherein said two gears of said coupling means are formed as spur gears, and said respective gear means comprises an adjusting spur gear associated with said adjusting means and a display spur gear associated with said display means.

3. A device according to claim 2, wherein said adjusting means comprises an adjusting bushing, and said adjusting spur gear is formed on a shell of said adjusting bushing.

4. A device according to claim 2, wherein said display spur gear is a drive gear of said display means which is formed as a counting mechanism.

5. A device according to claim 2, further comprising a common basic body, said common body having said common axis and two other axes arranged on opposite sides of said common axis, and said adjusting spur gear and said display spur gear being arranged on respective ones of said two other axes and supported on said common body.

6. A device according to claim 5, wherein said body has a hollow shoulder and said adjusting means comprises an adjusting bushing arranged on said hollow shoulder, and wherein said hollow shoulder has internal threads for enabling linear displacement of a pipet spindle which displaces the pipet plunger and which is secured to said adjusting bushing for joint rotation therewith whereby, upon rotation of said adjusting bushing, adjustment of the travel path of the pipet plunger is effected.

7. A device according to claim 6, wherein said shoulder has an end facing the pipet plunger for supporting a spring collar serving as a lower abutment of a pipet plunger rod.

8. A device according to claim 7, wherein said shoulder has an end opposite to said pipet plunger facing end for supporting an upper abutment of the pipet spindle.

9. A device according to claim 8, wherein said adjusting bushing has internal axial grooves for receiving radial projection of the upper abutment of the pipet spindle for securing said adjusting bushing with the pipet spindle.

10. A device according to claim 1 wherein said switching means includes a control lever projecting beyond a body of the pipet for enabling actuation of said switching means from outside the body.

11. A device according to claim 1, further comprising a sliding member arranged on the common axis for engaging said two gears.

12. A device according to claim 3, wherein said adjusting bushing has a portion projecting from a pipet body and having markings corresponding to respective markings provided on the pipet body.

* * * * *